United States Patent [19]

Sagara

[11] 4,055,435
[45] Oct. 25, 1977

[54] GLASS COMPOSITIONS FOR OPHTHALMIC LENSES
[75] Inventor: Hiroji Sagara, Akikawa, Japan
[73] Assignee: Hoya Glass Works, Ltd., Tokyo, Japan
[21] Appl. No.: 692,074
[22] Filed: June 2, 1976
[30] Foreign Application Priority Data
June 2, 1975 Japan .................................. 50-66270
July 10, 1975 Japan .................................. 50-84798
[51] Int. Cl.$^2$ ............................ C03C 3/04; C03C 3/08
[52] U.S. Cl. .................................. 106/52; 106/47 Q; 106/54
[58] Field of Search .................. 106/47 Q, 52, 54
[56] References Cited
U.S. PATENT DOCUMENTS

| | | | |
|---|---|---|---|
| 3,716,385 | 2/1973 | Ritze .................................. | 106/47 Q |
| 3,740,242 | 6/1973 | Faulstick et al. ..................... | 106/54 |
| 3,879,207 | 4/1975 | Hartman ............................. | 106/47 Q |
| 3,964,918 | 6/1976 | Hanes et al. ......................... | 106/54 |
| 3,970,466 | 7/1976 | Faulstick ............................ | 106/54 |

*Primary Examiner*—Winston A. Douglas
*Assistant Examiner*—Mark Bell
*Attorney, Agent, or Firm*—Sughrue, Rothwell, Mion, Zinn and Macpeak

[57] ABSTRACT

A glass composition for an ophthalmic lens having a refractive index of at least 1.69, an Abbe value of at least 39 and a specific gravity of not more than 3.2 and comprising, in percent by weight:

1. 42 to 52 $SiO_2 + Al_2O_3 + B_2O_3$ with 20 to 42 $SiO_2$, 5 to 13 $Al_2O_3$ and 0 to 20 $B_2O_3$;
2. 22 to 39 $CaO + MgO$ with 12 to 39 CaO and 0 to 20 MgO;
3. 15 to 28 $ZrO_2 + TiO_2 + Nb_2O_5$ with 0 to 7 $ZrO_2$, 5 to 13 $TiO_2$ and 0 to 15 $Nb_2O_5$;
4. 0 to 15 $BaO + SrO + ZnO$ with 0 to 6 BaO, 0 to 10 SrO and 0 to 15 ZnO; and
5. 0 to 10 $La_2O_3 + Ta_2O_5 + WO_3$ with 0 to 10 $La_2O_3$, 0 to 6 $Ta_2O_5$ and 0 to 10 $WO_3$.

4 Claims, 2 Drawing Figures

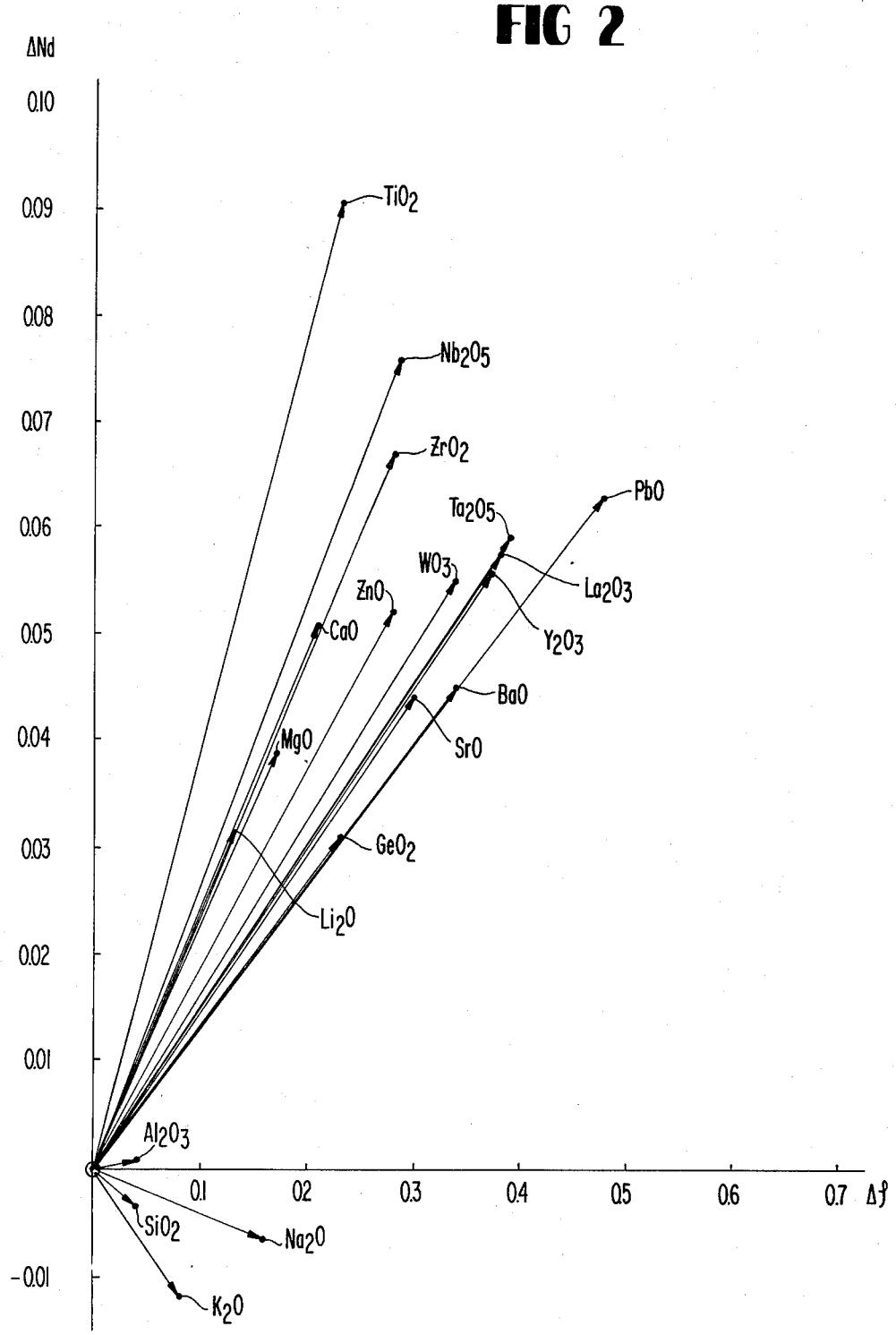

GLASS COMPOSITIONS FOR OPHTHALMIC LENSES

BACKGROUND OF THE INVENTION

1. Field of the Invention

This invention relates to glass compositions for ophthalmic lenses having a refractive index of at least 1.69, an Abbe value of at least 39 and a specific gravity of not more than 3.2.

2. Description of the Prior Art

The rate of correction of an ophthalmic lens depends upon its refractive index and the curvatures of both surfaces thereof. When myopia or hypermetropia advances, a lens having a thicker edge portion or central portion is required in order to correct the same. This not only impairs the beautiful appearance of the ophthalmic lens, but the heavy weight thereof also makes the wearer uncomfortable.

Accordingly, ophthalmic lenses which are light in weight and which have a high refractive index have been desired, and Japanese Patent Application (OPI) 87716/74 discloses an ophthalmic lens glass which is intended for this purpose. However, the glass disclosed in this Patent Application has an Abbe value of as low as 30.0 to 31.5, and has the defect that when it is used as an ophthalmic lens, it has high chromatic aberration at its outer edge portions. Especially in the case of ophthalmic lenses having a high diopter value, their chromatic aberration is high.

SUMMARY OF THE INVENTION

It is an object of this invention to provide glass compositions for ophthalmic lenses which are light in weight, have a high refractive index and a relatively large Abbe value, thereby overcoming the above disadvantages of the prior art.

According to this invention, there is first provided a glass composition for ophthalmic lenses having a refractive index ($nd$) of at least 1.69, an Abbe value ($\nu d$) of at least 39 and a specific gravity of not more than 3.2, the composition comprising, in weight percent, 42 to 52 of $SiO_2 + Al_2O_3 + B_2O_3$ with 20 to 42 $SiO_2$, 5 to 13 $Al_2O_3$ and 0 to 20 $B_2O_3$, 22 to 39 $CaO + MgO$ with 12 to 39 $CaO$ and 0 to 20 $MgO$, 15 to 28 $ZrO_2 + TiO_2 + Nb_2O_5$ with 0 to 7 $ZrO_2$, 5 to 13 $TiO_2$ and 0 to 15 $Nb_2O_5$, 0 to 15 $BaO + SrO + ZnO$ with 0 to 6 $BaO$, 0 to 10 $SrO$ and 0 to 15 $ZnO$, and 0 to 10 $La_2O_3 + Ta_2O_5 + WO_3$ with 0 to 10 $La_2O_3$, 0 to 6 $Ta_2O_5$ and 0 to 10 $WO_3$.

The invention also provides a glass composition for ophthalmic lenses having a refractive index ($nd$) of at least 1.69, an Abbe value ($\nu d$) of at least 39 and a specific gravity of not more than 3.2, the composition comprising, in weight percent, 40 to 52 $SiO_2 + Al_2O_3 + B_2O_3$ with 20 to 52 $SiO_2$, 0 to 13 $Al_2O_3$ and 0 to 20 $B_2O_3$, 10 to 35 $CaO + MgO$ with 1 to 35 $CaO$ and 0 to 20 $MgO$, 1 to 20 $Li_2O + Na_2O + K_2O$ with 0 to 15 $Li_2O$ and 0 to 15 $Na_2O + K_2O$, 14 to 30 $ZrO_2 + TiO_2 + Nb_2O_5$ with 0 to 11 $ZrO_2$, 4 to 14 $TiO_2$ and 0 to 20 $Nb_2O_5$, 0 to 15 $BaO + SrO + ZnO$ with 0 to 8 $BaO$, 0 to 12 $SrO$ and 0 to 15 $ZnO$, and 0 to 15 $La_2O_3 + Ta_2O_5 + WO_3$ with 0 to 12 $La_2O_3$, 0 to 10 $Ta_2O_5$ and 0 to 15 $WO_3$.

BRIEF DESCRIPTION OF THE DRAWINGS

FIG. 1 and FIG. 2 show variations of refractive index and specific gravity wherein $B_2O_3$ of the present invention is replaced by other components outside the present invention.

DETAILED DESCRIPTION OF THE INVENTION

Figure 1:
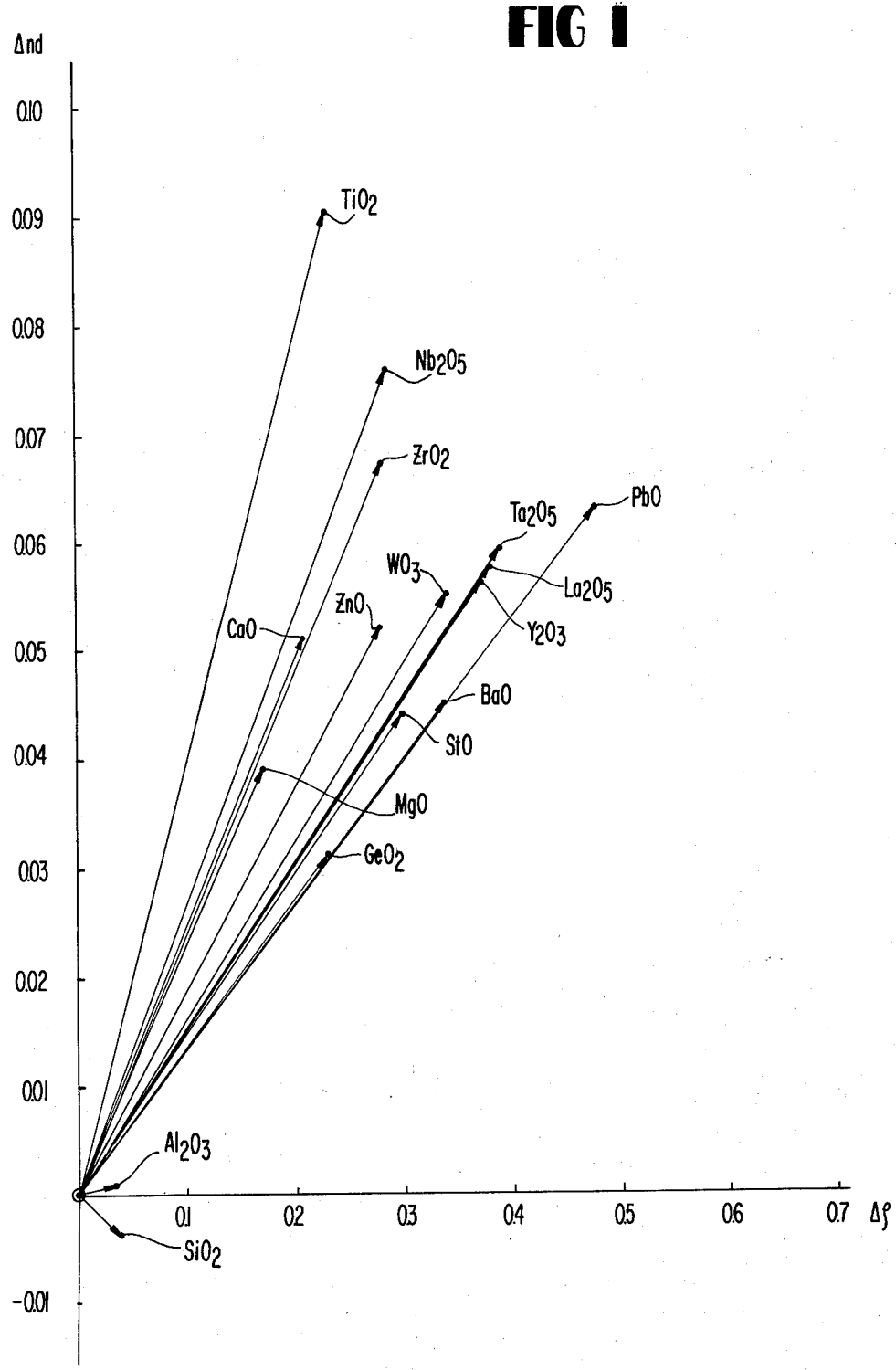

FIG. 1 shows variations in refractive index ($\Delta nd$) and in specific gravity ($\Delta \rho$) when within the constituent proportion range of the glass composition of this invention 10% by weight of $B_2O_3$ is replaced by each of the other components indicated. It is apparent from FIG. 1 that in order to obtain a glass having a high refractive index and a low specific gravity, it is most advantageous to employ $CaO$ and $MgO$ as divalent components and $ZrO_2$, $TiO_2$ and $Nb_2O_5$ as high atomic valency components. We have found that by limiting the proportions of the ingredients of a glass composition containing these components as essential components to the specific range given hereinabove with regard to the first aspect of the invention, there can be obtained a glass composition which not only is light in weight, but also has a high refractive index, a relatively high Abbe value, and the chemical durability to withstand use as an ophthalmic lens, and which has sufficient stability so as to enable it to be produced in large quantities.

In the glass composition according to the first aspect of this invention, $SiO_2$, $Al_2O_3$ and $B_2O_3$ are components which make up the skeletal structure of glass. When the total proportion of these ingredients exceeds 52% by weight, the desired high refractive index cannot be obtained, and if it is less than 42%, the desired light weight glass cannot be obtained.

When the proportion of $SiO_2$ is less than 20% and the proportion of $B_2O_3$ is above 20%, the chemical durability of the glass is deteriorated, and the glass cannot be used for an ophthalmic lens. When the proportion of $SiO_2$ is above 42%, the glass becomes not only difficult to melt but is also unstable.

When the proportion of $Al_2O_3$ is less than 5%, the resulting glass shows a high tendency of phase separation, and when it is above 13%, the glass has a strong tendency to crystallize.

$CaO$ and $MgO$ are components needed to stabilize the glass against devitrification. When the total proportion of these two components is more than 39%, the chemical durability of the glass is deteriorated, and when it is less than 12%, the glass shows a strong tendency to crystallize; moreover, the glass is heavily colored brown due to the $TiO_2$.

When the proportion of $CaO$ is less than 12% and the proportion of $MgO$ is above 20%, the glass shows a strong tendency to crystallize. If the proportion of $CaO$ is above 39%, the chemical durability of the glass is deteriorated, and it cannot be used for an ophthalmic lens.

On the other hand, when the total proportion of $ZrO_2$, $TiO_2$ and $Nb_2O_5$ is above 28%, the desired Abbe value cannot be obtained, and the glass becomes unstable. When it is less than 15%, the high refractive index of the glass cannot be maintained, and its chemical durability is deteriorated.

Of these ingredients, $ZrO_2$ is an ingredient which contributes to the crystallization stabilizing of the glass and to increase its Abbe value to some extent. When the proportion of $ZrO_2$ is above 7%, there is an abrupt increase in the tendency of the glass to crystallize.

$TiO_2$ is required in an amount of at least 5% in order to give the highest refractive index and a low specific gravity. If it is above 13%, the desired Abbe value cannot be maintained.

$Na_2O_5$ is not an essential ingredient, but since it brings about an Abbe value intermediate $ZrO_2$ and $TiO_2$, its amount can be increased without reducing the Abbe value as much as in the case of $TiO_2$, and it is effective to obtain glasses having especially superior chemical durability by increasing the total amount of the high atomic valency components. As it is relatively expensive, its use in an amount of more than 15% is not desirable.

In order to stabilize the glass and control its Abbe value, BaO, SrO, ZnO, $La_2O_3$, $Ta_2O_5$ and $WO_3$ are incorporated in the glass composition of this invention. When the amounts of BaO, SrO and ZnO are above 6%, 10% and 15%, respectively, or the total proportion of these components is above 15%, or when the amounts of $La_2O_3$, $Ta_2O_5$ and $WO_3$ are above 10%, 6% and 10%, respectively, or the total proportion of these components is above 10%, the desired specific gravity cannot be obtained.

Although a small amount of $Y_2O_3$ or $GeO_2$ can be added to the glass composition without deteriorating the properties of the glass, such components are expensive, and economically undesirable.

FIG. 2 shows variations in refractive index ($\Delta nd$) and in specific gravity ($\Delta \rho$) when within the constituent proportion range of the glass composition in accordance with the second aspect of this invention, 10% by weight of $B_2O_3$ is replaced by each of the other components indicated. In this figure, the standard point is represented by ⊙. It is apparent that in order to obtain a glass having high refractive index and a low specific gravity, it is most advantageous to use $Li_2O$ as a monovalent component, CaO and MgO as divalent components, and $ZrO_2$, $TiO_2$ and $Nb_2O_5$ as high atomic valency components. We have found that by limiting the proportions of the ingredients of a glass composition containing these components as essential components to the specific range given hereinabove, with regard to the second aspect of the invention, there can be obtained a glass composition which not only is light in weight, but which also has a high refractive index, a relatively high Abbe value, and the chemical durability to withstand use as an ophthalmic lens, and which has sufficient stability so as to enable it to be produced in large quantities. Further, this glass composition can be chemically tempered by ion exchange, as disclosed in U.S. Pat. No. 3,529,946 and 3,615,320.

In the glass composition according to the second embodiment of the invention, $SiO_2$, $Al_2O_3$ and $B_2O_3$ are components which make up the skeleton of the glass. When the total proportion of these basic ingredients exceeds 52% by weight, the desired high refractive index cannot be obtained. When it is less than 40%, the desired light weight glass cannot be obtained.

When the proportion of $SiO_2$ is less than 20% and the proportion of $B_2O_3$ is above 20%, the chemical durability of the glass is deteriorated, and it cannot be used as an ophthalmic lens. When the proportion of $SiO_2$ exceeds 52%, the desired high refractive index cannot be obtained.

Furthermore, when the proportion of $Al_2O_3$ exceeds 13%, the glass shows a strong tendency to crystallize.

CaO and MgO are required to stabilize the glass against devitrification. When the total proportion of these components is more than 35% and less than 10%, the glass shows a strong tendency to crystallize. MgO is not an essential ingredient, but is effective for stabilizing the glass when used in place of a part of the CaO. When the proportion of MgO exceeds 20%, the glass shows a strong tendency to crystallize.

$Li_2O$, $Na_2O$ and $K_2O$, which differentiate the glass composition of the second aspect from that of the first aspect, are required in order to inhibit the tendency of the glass to undergo phase separation, and to highly stabilize the glass against devitrification. These ingredients are used in a total proportion of at least 1%, but when their total proportion exceeds 20%, the chemical durability of the glass is deteriorated, and it cannot be used for an ophthalmic lens. $Li_2O$ is a component which is most advantageous for obtaining a glass having a low specific gravity, and also has good chemical durability against $Na_2O$ and $K_2O$. However, when the proportion of $Li_2O$ exceeds 15%, the glass shows a strong tendency to crystallize. Although $Na_2O$ and $K_2O$ are effective for stabilizing the glass, when the total proportion of these two components exceeds 15%, the chemical durability of the glass is deteriorated, and it cannot be used as an ophthalmic lens. Moreover, a desired light weight glass cannot be obtained.

When the total proportion of $ZrO_2$, $TiO_2$ and $Nb_2O_5$ is more than 30%, the desired Abbe value cannot be obtained, and the glass becomes easy to crystallize. When it is less than 14%, a high refractive index cannot be maintained, and the chemical durability of the glass is deteriorated. Of these ingredients, $ZrO_2$ is advantageous for stabilization of the glass, and it somewhat increases the Abbe value. When the proportion of $ZrO_2$ is above 11%, there is an abruptly increased tendency of crystallization of the glass. $TiO_2$ is required in an amount of at least 4% in order to give the highest refractive index and a low specific gravity. If the proportion of $TiO_2$ is above 14%, the desired Abbe value cannot be maintained. $Nb_2O_5$ is not essential, but brings about an Abbe value intermediate $ZrO_2$ and $TiO_2$. It is possible, therefore, to increase the amount of $Nb_2O_5$ to be added without reducing the Abbe value as much as in the case of $TiO_2$. Hence, $Nb_2O_5$ is effective for making a glass having especially superior chemical durability by increasing the total amount of high atomic valency components, and it also increases the stability of the glass. However, since it is relatively expensive, the use of $Nb_2O_5$ in a proportion above 20% is not desirable.

BaO, SrO, ZnO, $La_2O_3$, $Ta_2O_5$ and $WO_3$ can be incorporated as additional components primarily to stabilize the glass and control its Abbe value. When the amounts of BaO, SrO and ZnO are above 8%, 12% and 15%, respectively or the total proportion of these components is above 15%, or when the amounts of $La_2O_3$, $Ta_2O_5$ and $WO_3$ are above 12%, 10% and 15%, respectively or the total proportion of these components is above 15%, the desired specific gravity cannot be obtained.

A small amount of $Y_2O_3$, $Gd_2O_2$ or $GeO_2$ can be added in a proportion which does not deteriorate the characteristics of the glass, but since these components are expensive, it is not economically desirable to add them.

Examples of the glass compositions of this invention and their characteristics are shown in the following Tables 1 and 2. In the following, all proportions are by weight percent.

Each of these glass compositions was prepared by melting a starting mixture consisting, for example, of silica powder, aluminum hydroxide, boric acid, calcium carbonate, magnesium carbonate, zirconium oxide, titanium oxide, and niobium oxide in a platinum crucible at a temperature of 1,300° to 1,450° C, stirring the mixture to render it homogeneous, removing bubbles therefrom, casting it in a mold pre-heated to a suitable temperature, and then annealing it.

As a specific example for forming 50 kg of glass:
Raw materials of the following composition were weighed out:

| Oxide | % by Weight | Raw Materials | Weight Quantity in kg |
|---|---|---|---|
| $B_2O_3$ | 5.0 | $H_3BO_3$ | 4.44 |
| $SiO_2$ | 40.3 | $SiO_2$ | 20.15 |
| CaO | 23.1 | $CaCO_3$ | 20.61 |
| $Li_2O$ | 8.0 | $Li_2CO_3$ | 9.89 |
| $ZrO_2$ | 5.0 | $ZrO_2$ | 2.50 |
| $TiO_2$ | 8.6 | $TiO_2$ | 4.30 |
| $Nb_2O_5$ | 10.0 | $Nb_2O_5$ | 5.00 |

The batch was mixed and melted in a platinum crucible at 1,350° C for 6 hours. After refining for 3 hours and stirring for 1 hour, the melt was discharged into a mold pre-heated to 400° C, and then annealed in a conventional manner.

The acid resistance of the glass composition was determined in accordance with the method for measuring the chemical durability of an optical glass (powder method) stipulated in the Standards of the Japan Association of the Optical Glass Industry. It represents the weight decrease (in percent) of a powder specimen when immersed for 1 hour in a 0.01N aqueous solution of nitric acid at 100° C.

The glass compositions shown in Table 1 are those in accordance with the first aspect of the invention, whereas the glass compositions shown in Table 2 are those in accordance with the second embodiment of this invention.

TABLE I

| Run No. | 1 | 2 | 3 | 4 | 5 | 6 | 7 | 8 |
|---|---|---|---|---|---|---|---|---|
| $B_2O_3$ | — | 16.4 | 7.0 | 17.5 | 18.0 | 9.5 | 2.4 | 17.0 |
| $SiO_2$ | 35.6 | 21.0 | 28.0 | 22.0 | 23.0 | 27.0 | 37.5 | 23.0 |
| $Al_2O_3$ | 12.4 | 11.0 | 9.4 | 8.5 | 6.5 | 10.0 | 8.0 | 8.4 |
| CaO | 22.0 | 21.0 | 24.9 | 15.9 | 13.0 | 14.5 | 28.5 | 15.0 |
| MgO | 6.0 | 7.0 | 11.0 | 6.0 | 4.0 | 16.0 | — | 6.0 |
| $ZrO_2$ | 5.0 | 5.0 | — | 5.0 | 4.0 | 7.0 | 5.0 | 5.0 |
| $TiO_2$ | 6.0 | 7.0 | 11.7 | 9.0 | 11.4 | 9.0 | 6.8 | 12.7 |
| $Nb_2O_5$ | 13.0 | 11.6 | 5.0 | 5.6 | 1.0 | 5.0 | 11.8 | — |
| BaO | — | — | — | 3.0 | — | — | — | — |
| SrO | — | — | — | — | 8.0 | — | — | — |
| ZnO | — | — | 3.0 | 5.5 | 3.0 | 2.0 | — | 6.0 |
| $La_2O_3$ | — | — | — | — | 8.1 | — | — | 6.9 |
| $Ta_2O_3$ | — | — | — | 1.0 | — | — | — | — |
| $WO_3$ | — | — | — | 1.0 | — | — | — | — |
| nd | 1.704 | 1.704 | 1.710 | 1.700 | 1.704 | 1.701 | 1.705 | 1.708 |
| νd | 40.0 | 40.0 | 39.5 | 39.7 | 40.1 | 40.6 | 40.1 | 39.1 |
| Specific gravity | 3.12 | 3.04 | 3.08 | 3.11 | 3.19 | 3.08 | 3.10 | 3.12 |
| Acid resistance | 0.1 | 0.2 | 0.3 | 0.3 | 0.4 | 0.2 | 0.1 | 0.3 |

TABLE 2

| Run No. | 1 | 2 | 3 | 4 | 5 | 6 | 7 | 8 |
|---|---|---|---|---|---|---|---|---|
| $B_2O_3$ | | 17.0 | 7.0 | 8.0 | | | | |
| $SiO_2$ | 35.0 | 23.0 | 33.0 | 33.0 | 47.3 | 47.3 | 40.6 | 42.6 |
| $Al_2O_3$ | 12.4 | 8.4 | 4.4 | 6.5 | | | | |
| CaO | 22.6 | 15.0 | 20.0 | 13.0 | 20.1 | 25.1 | 28.8 | 20.0 |
| MgO | | | 13.0 | 4.0 | | | | |
| $Li_2O$ | 6.0 | 6.0 | 3.0 | 3.0 | 6.0 | 4.0 | 3.0 | 12.0 |
| $ZrO_2$ | 5.0 | 5.0 | | 4.0 | 5.0 | | 5.0 | 5.0 |
| $TiO_2$ | 6.0 | 12.7 | 11.6 | 11.4 | 6.5 | 6.8 | 7.8 | 7.8 |
| $Nb_2O_5$ | 13.0 | | 5.0 | 1.0 | 15.1 | 16.8 | 10.8 | 12.6 |
| $Na_2O$ | | | | | | | | |
| $K_2O$ | | | | | | | 4.0 | |
| BaO | | 2.0 | | | | | | |
| SrO | | | | 8.0 | | | | |
| ZnO | | 4.0 | 3.0 | | | | | |
| $La_2O_3$ | | 6.9 | | 6.1 | | | | |
| $Ta_2O_5$ | | | | 1.0 | | | | |
| $WO_3$ | | | | 1.0 | | | | |
| nd | 1.700 | 1.703 | 1.703 | 1.699 | 1.699 | 1.696 | 1.705 | 1.703 |
| νd | 40.3 | 39.7 | 40.0 | 40.3 | 39.7 | 39.7 | 39.9 | 39.8 |
| Specific gravity | 3.04 | 3.06 | 3.03 | 3.15 | 3.03 | 3.03 | 3.07 | 2.98 |
| Acid resistance | 0.2 | 0.3 | 0.3 | 0.2 | <0.1 | <0.1 | <0.1 | <0.1 |
| Run No. | 9 | 10 | 11 | 12 | 13 | 14 | 15 | 16 |
| $B_2O_3$ | | 9.5 | | | | | 5.0 | 5.0 |
| $SiO_2$ | 40.6 | 27.0 | 44.3 | 47.0 | 35.6 | 39.6 | 42.4 | 40.3 |
| $Al_2O_3$ | | 10.0 | | | 7.4 | | | |
| CaO | 23.8 | 14.5 | 31.7 | 25.4 | 22.0 | 15.0 | 5.5 | 23.1 |
| MgO | | 16.0 | | | 6.0 | | 15.0 | |
| $Li_2O$ | 3.0 | 2.0 | 7.0 | 4.0 | | 7.0 | 8.0 | 8.0 |
| $ZrO_2$ | 5.0 | 7.0 | 5.0 | 9.0 | 5.0 | 7.0 | 5.0 | 5.0 |
| $TiO_2$ | 7.8 | 9.0 | 12.0 | 9.6 | 6.0 | 5.3 | 9.3 | 8.6 |
| $Nb_2O_5$ | 10.8 | 5.0 | | 5.0 | 13.0 | 16.1 | 9.8 | 10.0 |
| $Na_2O$ | 9.0 | | | | 5.0 | 10.0 | | |
| $K_2O$ | | | | | | | | |
| BaO | | | | | | | | |
| SrO | | | | | | | | |
| ZnO | | | | | | | | |
| $La_2O_3$ | | | | | | | | |
| $Ta_2O_5$ | | | | | | | | |
| $WO_3$ | | | | | | | | |
| nd | 1.690 | 1.698 | 1.696 | 1.700 | 1.696 | 1.690 | 1.690 | 1.703 |

TABLE 2-continued

| | | | | | | | | |
|---|---|---|---|---|---|---|---|---|
| νd | 39.5 | 41.1 | 41.5 | 40.7 | 39.7 | 39.0 | 39.8 | 40.3 |
| Specific gravity | 3.04 | 3.04 | 2.97 | 3.04 | 3.10 | 3.04 | 2.93 | 2.98 |
| Acid resistance | <0.1 | 0.2 | <0.1 | <0.1 | <0.1 | 0.1 | <0.1 | <0.1 |

While the invention has been described in detail and with reference to specific embodiments thereof, it will be apparent to one skilled in the art that various changes and modifications can be made therein without departing from the spirit and scope thereof.

What is claimed is:

1. A glass composition for an ophthalmic lens having a refractive index of at least 1.69, an Abbe value of at least 39 and a specific gravity of not more than 3.2 and consisting essentially of, in percent by weight:
   1. 42 to 52 $SiO_2 + Al_2O_3 + B_2O_3$ with 20 to 42 $SiO_2$, 5 to 13 $Al_2O_3$ and 0 to 20 $B_2O_3$;
   2. 22 to 39 $CaO + MgO$ with 12 to 39 $CaO$ and 0 to 20 $MgO$;
   3. 15 to 28 $ZrO_2 + TiO_2 + Nb_2O_5$ with 0 to 7 $ZrO_2$, 5 to 13 $TiO_2$ and 0 to 15 $Nb_2O_5$;
   4. 0 to 15 $BaO + SrO + ZnO$ with 0 to 6 $BaO$, 0 to 10 $SrO$ and 0 to 15 $ZnO$; and
   5. 0 to 10 $La_2O_3 + Ta_2O_5 + WO_3$ with 0 to 10 $La_2O_3$, 0 to 6 $Ta_2O_5$ and 0 to 10 $WO_3$.

2. A glass composition for an ophthalmic lens as described in claim 1 having a refractive index of at least 1.70, an Abbe value of at least 40 and a specific gravity of not more than 3.1 and consisting essentially of, in percent by weight:
   1. 44 to 50 $SiO_2 + Al_2O_3 + B_2O_3$ with 25 to 42 $SiO_2$, 5 to 11 $Al_2O_3$ and 0 to 10 $B_2O_3$;
   2. 22 to 35 $CaO + MgO$ with 15 to 35 $CaO$ and 0 to 15 $MgO$;
   3. 17 to 26 $ZrO_2 + TiO_2 + Nb_2O_5$ with 2 to 7 $ZrO_2$, 5 to 11 $TiO_2$ and 4 to 15 $Nb_2O_5$; and
   4. 0 to 8 $BaO + SrO + ZnO + La_2O_3 + Ta_2O_5 + WO_3$ with 0 to 5 $BaO$, 0 to 5 $SrO$, 0 to 8 $ZnO$, 0 to 5 $La_2O_3$, 0 to 5 $Ta_2O_5$ and 0 to 5 $WO_3$.

3. A glass composition for an ophthalmic lens having a refractive index of at least 1.69, an Abbe value of at least 39 and a specific gravity of not more than 3.2 and consisting essentially of, in percent by weight:
   1. 40 to 52 $SiO_2 + Al_2O_3 + B_2O_3$ with 20 to 52 $SiO_2$, 0 to 13 $Al_2O_3$ and 0 to 20 $B_2O_3$;
   2. 10 to 35 $CaO + MgO$ with 1 to 35 $CaO$ and 0 to 20 $MgO$;
   3. 1 to 20 $Li_2O + Na_2O + K_2O$ with 0 to 15 $Li_2O$ and 0 to 15 $Na_2O + K_2O$;
   4. 14 to 30 $ZrO_2 + TiO_2 + Nb_2O_5$ with 0 to 11 $ZrO_2$, 4 to 14 $TiO_2$ and 0 to 20 $Nb_2O_5$;
   5. 0 to 15 $BaO + SrO + ZnO$ with 0 to 8 $BaO$, 0 to 12 $SrO$ and 0 to 15 $ZnO$; and
   6. 0 to 15 $La_2O_3 + Ta_2O_5 + WO_3$ with 0 to 12 $La_2O_3$, 0 to 10 $Ta_2O_5$ and 0 to 15 $WO_3$.

4. A glass composition for an ophthalmic lens as described in claim 3 having a refractive index of at least 1.70, an Abbe value of 40 and a specific gravity of not more than 3.0 and consisting essentially of, in percent by weight:
   1. 42 to 50 $SiO_2 + Al_2O_3 + B_2O_3$ with 33 to 50 $SiO_2$, 0 to 5 $Al_2O_3$ and 0 to 15 $B_2O_3$;
   2. 15 to 30 $CaO + MgO$ with 10 to 30 $CaO$ and 0 to 10 $MgO$;
   3. 2 to 15 $Li_2O + Na_2O + K_2O$ with 2 to 12 $Li_2O$ and 0 to 5 $Na_2O + K_2O$;
   4. 17 to 30 $ZrO_2 + TiO_2 + Nb_2O_5$ with 2 to 7 $ZrO_2$, 4 to 11 $TiO_2$ and 4 to 20 $Nb_2O_5$; and
   5. 0 to 5 $BaO + SrO + ZnO + La_2O_3 + Ta_2O_5 + WO_3$ with 0 to 4 $BaO$, 0 to 4 $SrO$, 0 to 5 $ZnO$, 0 to 4 $La_2O_3$, 0 to 4 $Ta_2O_5$ and 0 to 5 $WO_3$.

* * * * *